(12) United States Patent
Artsyukhovich et al.

(10) Patent No.: US 8,937,769 B2
(45) Date of Patent: Jan. 20, 2015

(54) ORTHOGONAL LIGHT BEAM SPLITTING FOR MICROSCOPES

(75) Inventors: Alexander N. Artsyukhovich, San Juan Capistrano, CA (US); Mikhail Boukhny, Laguna Niguel, CA (US); Z. Aras Aslan, Irvine, CA (US)

(73) Assignee: Alcon Research, Ltd., Fort Worth, TX (US)

( * ) Notice: Subject to any disclaimer, the term of this patent is extended or adjusted under 35 U.S.C. 154(b) by 189 days.

(21) Appl. No.: 13/490,692

(22) Filed: Jun. 7, 2012

(65) Prior Publication Data
US 2013/0329298 A1 Dec. 12, 2013

(51) Int. Cl.
*G02B 27/08* (2006.01)
*G02B 27/14* (2006.01)

(52) U.S. Cl.
USPC ............ 359/618; 359/629; 359/636; 359/349

(58) Field of Classification Search
USPC ................. 359/349, 618, 629, 636–640, 831, 359/833–834
See application file for complete search history.

(56) References Cited

U.S. PATENT DOCUMENTS

| | | | |
|---|---|---|---|
| 4,786,155 A | 11/1988 | Fantone et al. | |
| 6,661,572 B2 | 12/2003 | Spink et al. | |
| 6,819,497 B2 * | 11/2004 | Suzuki et al. | 359/634 |
| 6,844,964 B2 | 1/2005 | Muentener | |
| 7,307,785 B2 | 12/2007 | Obrebski et al. | |
| 7,477,764 B2 | 1/2009 | Haisch | |
| 8,154,795 B2 | 4/2012 | Schnitzler et al. | |
| 2002/0159157 A1 | 10/2002 | Deverin et al. | |
| 2003/0040668 A1 | 2/2003 | Kaneko et al. | |
| 2003/0151833 A1 * | 8/2003 | Berman et al. | 359/831 |
| 2011/0257638 A1 | 10/2011 | Boukhny et al. | |
| 2012/0056996 A1 | 3/2012 | Sander et al. | |

OTHER PUBLICATIONS

Leica Microsystems, "Leica DI 0500 Dual Imaging Color Module: Outstanding optics and information technology", Jun. 2013, www.leica-microsystems.com, 12 pgs.
Carl Zeiss Meditec, "Clinical Solutions. MultiVision—The power to bring it all together", Jun. 2013, http://www.meditec.zeiss.com/C1256CAB00599F5D/Contents-Frame/344E94A8A65815018825726B00833872, 1 pg.

(Continued)

*Primary Examiner* — Thomas K Pham
*Assistant Examiner* — Brandi Thomas

(57) ABSTRACT

A system comprises first and second beamsplitter modules aligned along an alignment line. In certain embodiments, each beamsplitter module can split a beam traveling along a first optical path into a first split beam and a second split beam within a spectral range. Each beamsplitter module can transmit the first split beam along the first optical path and direct the second split beam along a second optical path substantially orthogonal to the first optical path and to the alignment line. In certain embodiments, each beamsplitter module can receive a first beam traveling along a first optical path and a second beam traveling along a second optical path that is substantially orthogonal to the first optical path and to the alignment line. Each beamsplitter module can combine the second beam with the first beam to yield a combined beam and transmit the combined beam along the first optical path.

8 Claims, 4 Drawing Sheets

(56) References Cited

OTHER PUBLICATIONS

Carl Zeiss Meditec, "Clinical Solutions. MultiVision—Your Surgical Cockpit", Jun. 2013, http://www.meditec.zeiss.com/C125679E0051C774/Contents-Frame/A3AB66669271C19641256A7000442223, 1 pg.

Carl Zeiss Meditec, "Clinical Solutions. MultiVision—Benefits include:", Jun. 2013, http://www.meditec.zeiss.com/C125679E0051C774/Contents-Frame/A3AB66669271C19641256A7000442223, 1 pg.

* cited by examiner

ORTHOGONAL LIGHT BEAM SPLITTING FOR MICROSCOPES

TECHNICAL FIELD

The present disclosure relates generally to light beam splitting, and more particularly to orthogonal light beam splitting for microscopes.

BACKGROUND

A microscope receives a light beam from a target to yield an image of the target. In certain microscopes, the light beam may be split or combined with other beams. For example, the light beam may be split to yield split beams. The split beams can be directed to different destinations for different uses, e.g., to one or more eye pieces for viewing by one or more users and/or to a camera for recording. As another example, the light beam may be combined with another light beam to combine images. For example, a target image may be overlapped with an image providing information about microscope parameters.

BRIEF SUMMARY

A system comprises a first beamsplitter module and a second beamsplitter module aligned with the first beamsplitter module along an alignment line. In certain embodiments, each beamsplitter module can split a beam traveling along a first optical path into a first split beam and a second split beam. Each beamsplitter module can transmit the first split beam along the first optical path and direct the second split beam along a second optical path substantially orthogonal to the first optical path and to the alignment line. In certain embodiments, each beamsplitter module can receive a first beam traveling along a first optical path and a second beam traveling along a second optical path that is substantially orthogonal to the first optical path and to the alignment line. Each beamsplitter module can combine the second beam with the first beam to yield a combined beam and transmit the combined beam along the first optical path.

BRIEF DESCRIPTION OF THE DRAWINGS

Exemplary embodiments of the present disclosure will now be described by way of example in greater detail with reference to the attached figures, in which.

DESCRIPTION OF EXAMPLE EMBODIMENTS

Figure 1:
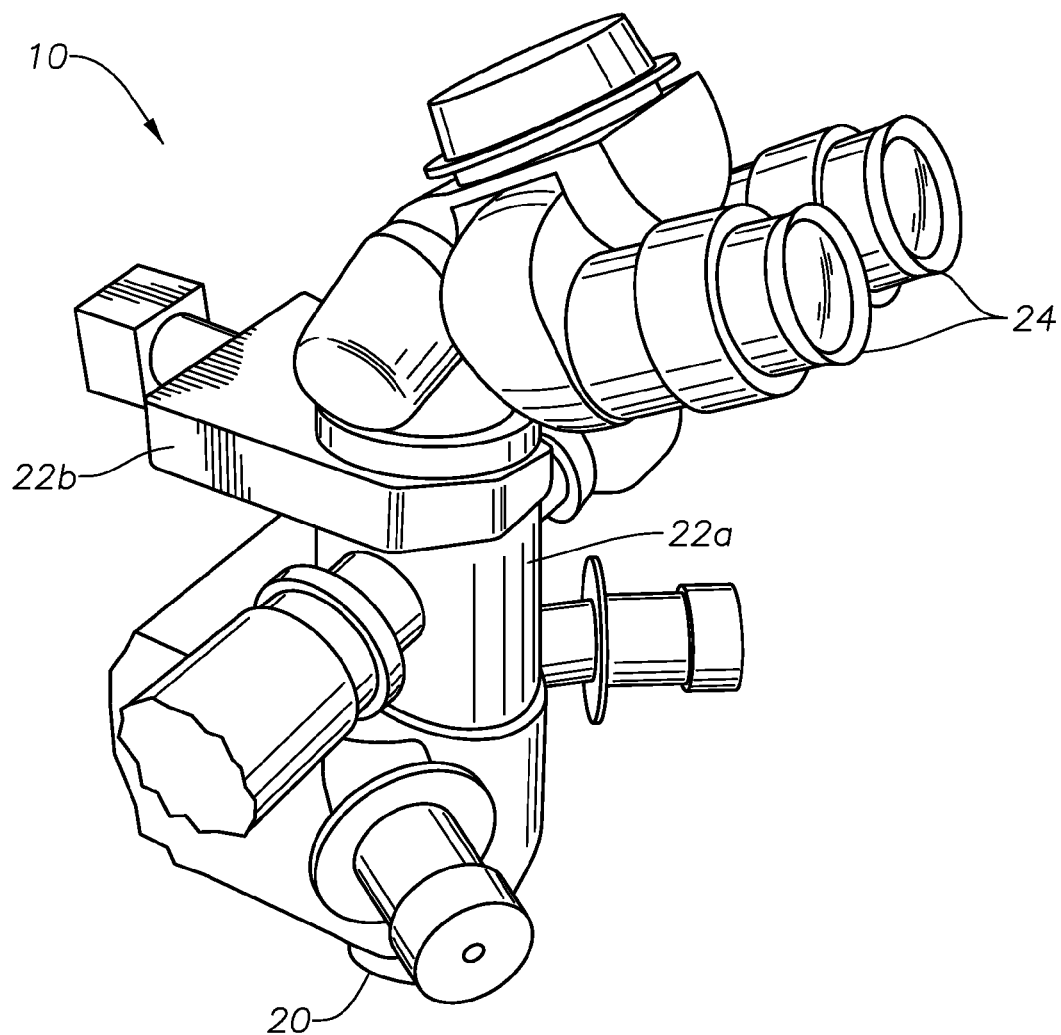
FIG. 1 illustrates an example of a microscope system that may utilize orthogonal beam splitting.

Referring now to the description and drawings, example embodiments of the disclosed apparatuses, systems, and methods are shown in detail. The description and drawings are not intended to be exhaustive or otherwise limit or restrict the claims to the specific embodiments shown in the drawings and disclosed in the description. Although the drawings represent possible embodiments, the drawings are not necessarily to scale and certain features may be exaggerated, removed, or partially sectioned to better illustrate the embodiments.

FIG. 1 illustrates an example of a microscope system 10 that may utilize orthogonal beam splitting. In the example, microscope system 10 includes an objective lens 20, one or more splitting systems 22 (22a-b), and one or more eyepieces 24. Microscope system 10 may be any suitable microscope, such as a surgical optical microscope. An optical microscope includes one or more lenses that produce an enlarged image of a target placed in the focal plane of the microscope. The lenses may focus light from (e.g., emitted or reflected from) the target towards a detector (such as an eye). The lenses may include objective lens 20, which gathers light from the target and focuses the light rays to produce a real image. An eyepiece 24 is located near the focal point of objective lens 20 to magnify the image. A splitting system 22 may split the light from the target and/or combine the target light with another light beam. Examples of splitting systems 22 are described in more detail in FIGS. 2 through 5.

Figure 2:
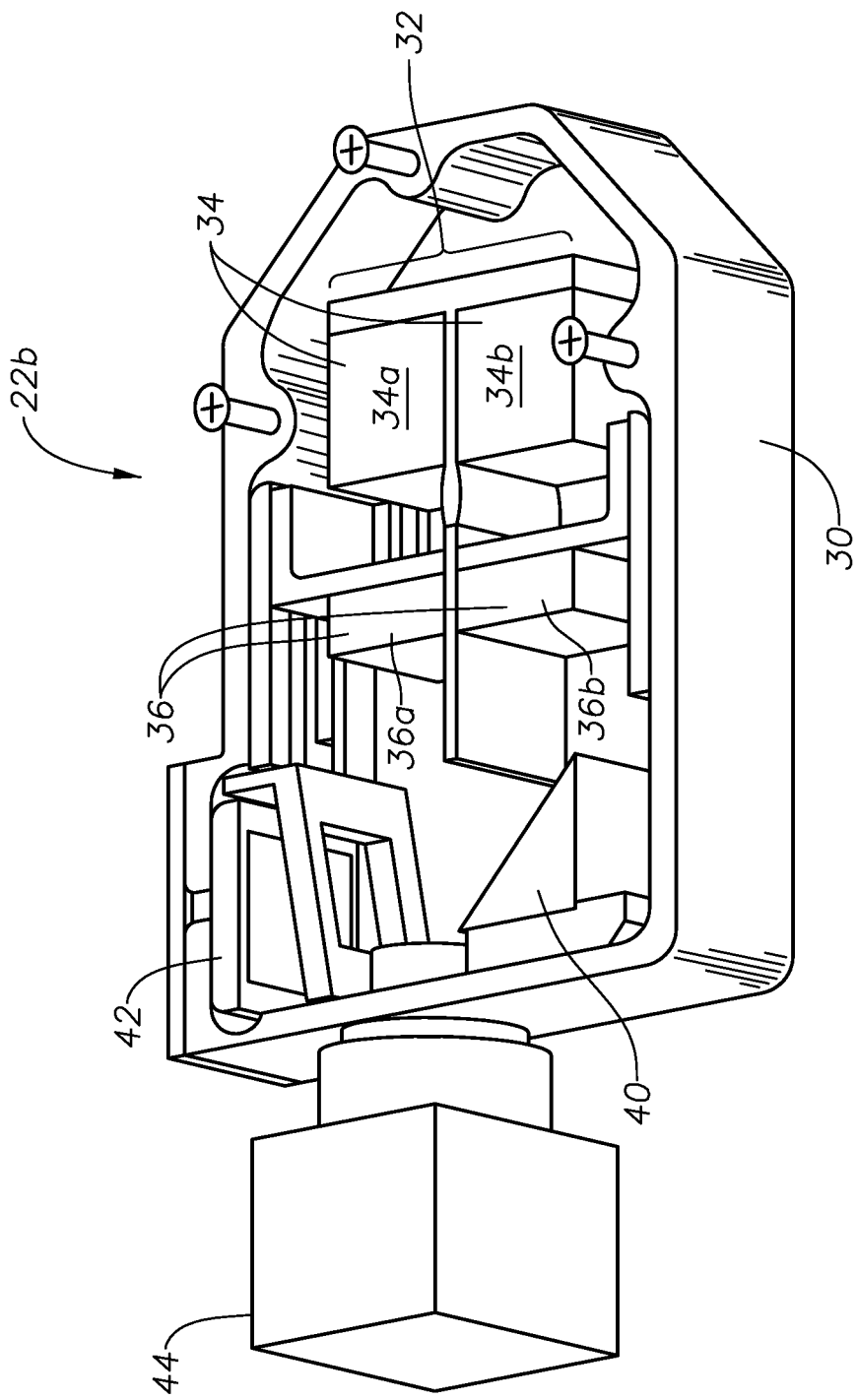
FIG. 2 illustrates an example of an orthogonal splitting system that may be used with the microscope system of FIG. 1.

FIG. 2 illustrates an example of an orthogonal splitting system 22a that may be used with microscope system 10 of FIG. 1. In the example, splitting system 22a has a housing 30, within which are disposed a beamsplitter system 32, lenses 36 (36a-b), a mirror 40, and an image display 42. An image capture module 44 is coupled to housing 30.

Beamsplitter system 32 comprises beamsplitter modules 34 (34a-c) and is described in more detail with reference to FIGS. 3 through 5. Lenses 36 direct light beams to and/or from beamsplitter modules 34. Image display 42 may display one or more images and may be any suitable image display, such as a light-emitting diode (LED) (e.g., organic LED). Mirror 40 may reflect image beams with images towards lenses 36, which may direct the image beams towards beamsplitter modules 34. Beamsplitter modules 34 may combine the image beams with other light beams. Image capture module 44 may receive light beams and generate one or more images (such as a single image or a stream of images) from the light beams. In the example, image capture module 44 may be a video camera and may receive light beams from beamsplitter modules 34 through image forming objective lens 36b to generate video images.

Figure 3:
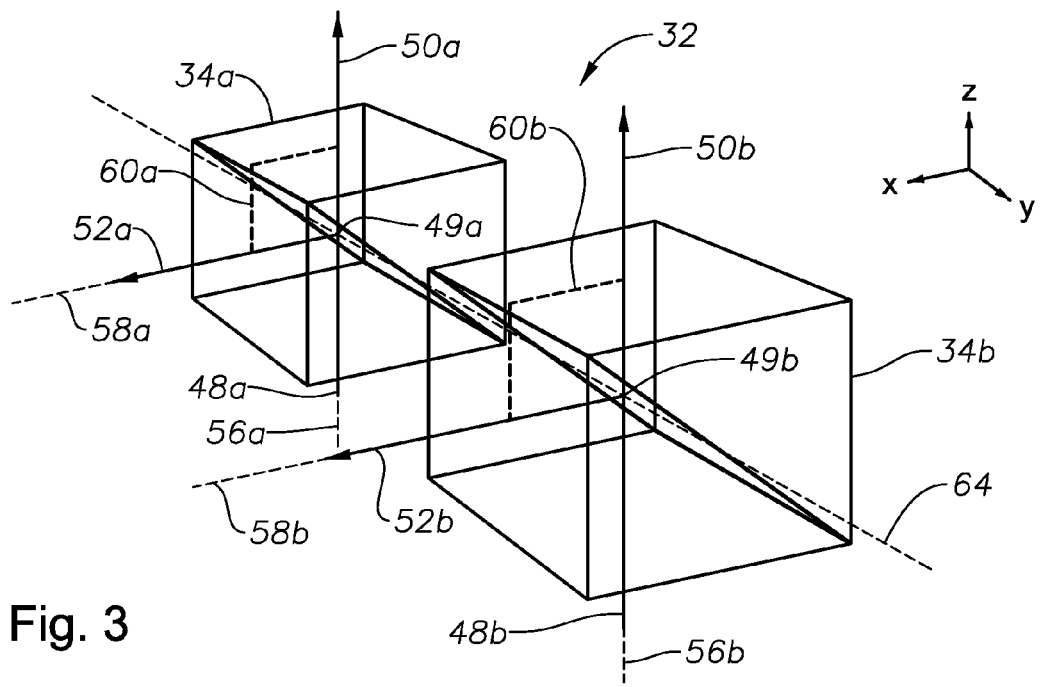
FIG. 3 illustrates an example of a beamsplitter system that may be utilized in a microscope system.

FIG. 3 illustrates an example of a beamsplitter system 32 that may be utilized in a microscope system, such as microscope system 10. In the example, beamsplitter system 32 comprises beamsplitter modules 34 (34a-b). Beamsplitter module 34 may comprise any suitable beamsplitter that can receive a light beam 48 (48a-b) and split received beam 48 at a splitting region 49 (49a-b) to yield a plurality of split beams 50 (50a-b), 52 (50a-b). In the example, split beam 50 may be regarded as a transmitted beam, and split beam 52 may be regarded as a reflected beam. The transmitted and reflected beams may constitute any suitable proportions of received beam 48. For example, the transmitted beam may be 50% and the reflected beam may be 50%, the transmitted beam may be less than 50% and the reflected beam may be greater than 50%, or the transmitted beam may be greater than 50% and the reflected beam may be less than 50%. In certain embodiments, a beamsplitter module 34 may operate within a suitable spectral range, e.g., the visible range.

The transmitted beam travels along a transmitted beam optical path 56 (56a-b) (which may be substantially the same optical path 56 as used by the received beam), and the reflected beam travels along a reflected beam optical path 58 (58a-b) that may be any suitable angle to the transmitted beam optical path 56. For example, the angle may be substantially 90°, less than 90°, or greater than 90°. The paths 56 and 58 may be regarded as defining an imaginary plane 60 (60a-b).

In certain embodiments, a beamsplitter module 34 may be a cube beamsplitter comprising two cemented right angle prisms. The reflected and transmitted beams may travel through the same amount of glass, so although the optical path length of each arm is increased, both paths are increased by the same amount.

In certain embodiments, beamsplitter module 34a is aligned with beamsplitter module 34b along an alignment line 64 in any suitable manner. For example, the modules 34 may be aligned such that one or more of the following conditions are satisfied: (1) planes 60a-b are substantially parallel to each other; (2) alignment line 64 is orthogonal to one or more planes 60a-b; (3) alignment line 64 intersects one or more splitting regions 49a-b; and/or (4) transmitted optical paths 56a-b defines a plane that is orthogonal to a plane defined by reflected optical paths 58a-b.

In certain embodiments, each beamsplitter module 34 may receive light beam 48 traveling along optical path 56. Beam 48 may have traveled from a target and through an objective lens to beamsplitter module 34. Beamsplitter module 34 may split the beam into split beams 50 and 52. Beamsplitter module 34 may transmit split beam 50 along a path that is substantially parallel to (e.g., substantially along) the first optical path. In certain embodiments, split beam 50 may be directed towards an eyepiece of a set of eyepieces. Beamsplitter module 34 may direct split beam 52 along a second optical path substantially orthogonal to the first optical path and to the alignment line. In certain embodiments, an image capture module may receive split beam 52 and generate one or more images from split beam 52.

Figure 4:
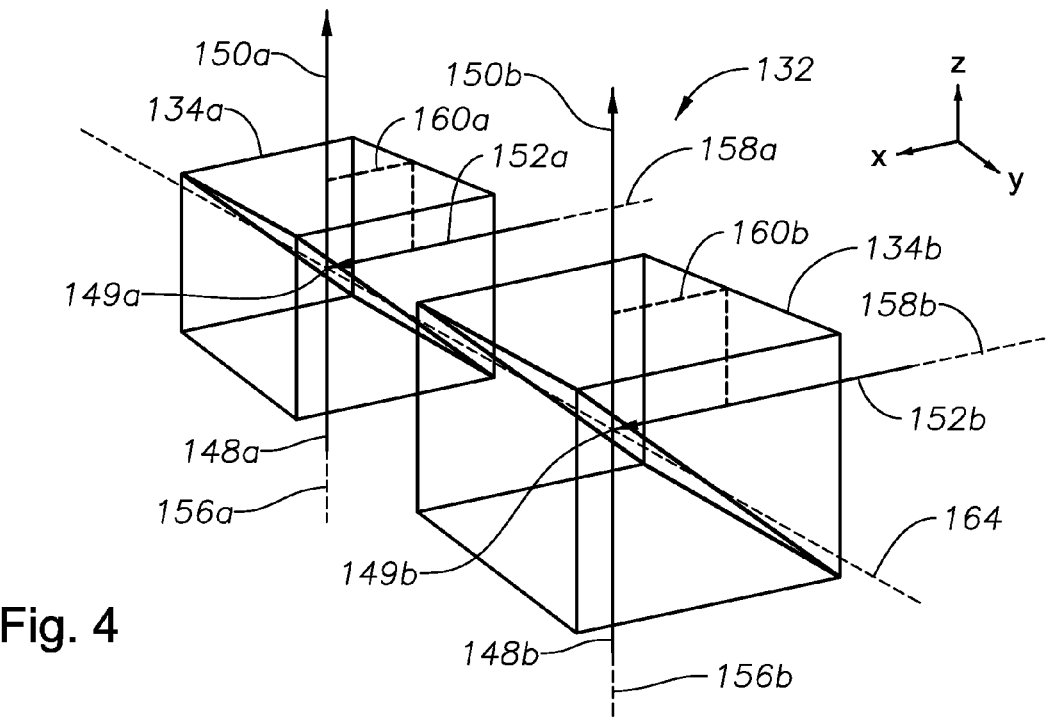
FIG. 4 illustrates another example of a beamsplitter system that may be utilized in a microscope system.

FIG. 4 illustrates an example of a beamsplitter system 132 that may be utilized in a microscope system. In the example, beamsplitter system 132 comprises beamsplitter modules 134 (134a-b). Beamsplitter module 134 may comprise any suitable beamsplitter that can receive a light beam 148 (148a-b) and a light beam 152 (a-b) and combine beams 148 and 152 at a combining region 149 (149a-b) to yield a combined beam 150 (150a-b). In the example, beam 148 may be regarded as a primary beam, and beam 152 may be regarded as a secondary beam. The primary and secondary beams may constitute any suitable proportions of combined beam 150. For example, the primary beam may be 50% and the secondary beam may be 50%, the primary beam may be less than 50% and the secondary beam may be greater than 50%, or the primary beam may be greater than 50% and the secondary beam may be less than 50%. In certain embodiments, a beamsplitter module 134 may operate within a suitable spectral range, e.g., the visible range or a narrow spectral band range.

The primary beam travels along a primary beam optical path 156 (156a-b) (which may be substantially the same optical path 156 as used by the combined beam), and the secondary beam travels along a secondary beam optical path 158 (58a-b) that may be any suitable angle to the primary beam optical path 156. For example, the angle may be substantially 90°, less than 90°, or greater than 90°. The paths 156 and 158 may be regarded as defining an imaginary plane 160 (60a-b).

In certain embodiments, a beamsplitter module 134 may be a cube beamsplitter comprising two cemented right angle prisms. The primary and secondary beams may travel through the same amount of glass, so although the optical path length of each arm is increased, both paths are increased by the same amount.

In certain embodiments, beamsplitter module 134a is aligned with beamsplitter module 134b along an alignment line 164 in any suitable manner. For example, the modules 134 may be aligned such that one or more of the following conditions are satisfied: (1) planes 160a-b are substantially parallel to each other; (2) alignment line 164 is orthogonal to one or more planes 160a-b; (3) alignment line 164 intersects one or more combining regions 149a-b; and/or (4) primary optical paths 156a-b defines a plane that is orthogonal to a plane defined by secondary optical paths 158a-b.

In certain embodiments, each beamsplitter module 134 may receive beam 148 traveling along optical path 156 and receive beam 152 traveling along optical path 158 that is substantially orthogonal to optical path 156 and to alignment line 164. Beamsplitter module 134 may transmit beam 148 and beam 152 along an output path that is substantially parallel to (e.g., along) optical path 156. In certain embodiments, beams 148 and 152 may be transmitted as combined beam 150 towards an eyepiece of a set of eyepieces. In certain embodiments, beam 148 may communicate an image of a target, and beam 152 may communicate one or more informational images conveying information such as microscope parameters. Beams 148 and 152 may be combined such as the images are injected into beam 148, e.g., the informational image is overlapped with the target image.

Figure 5:
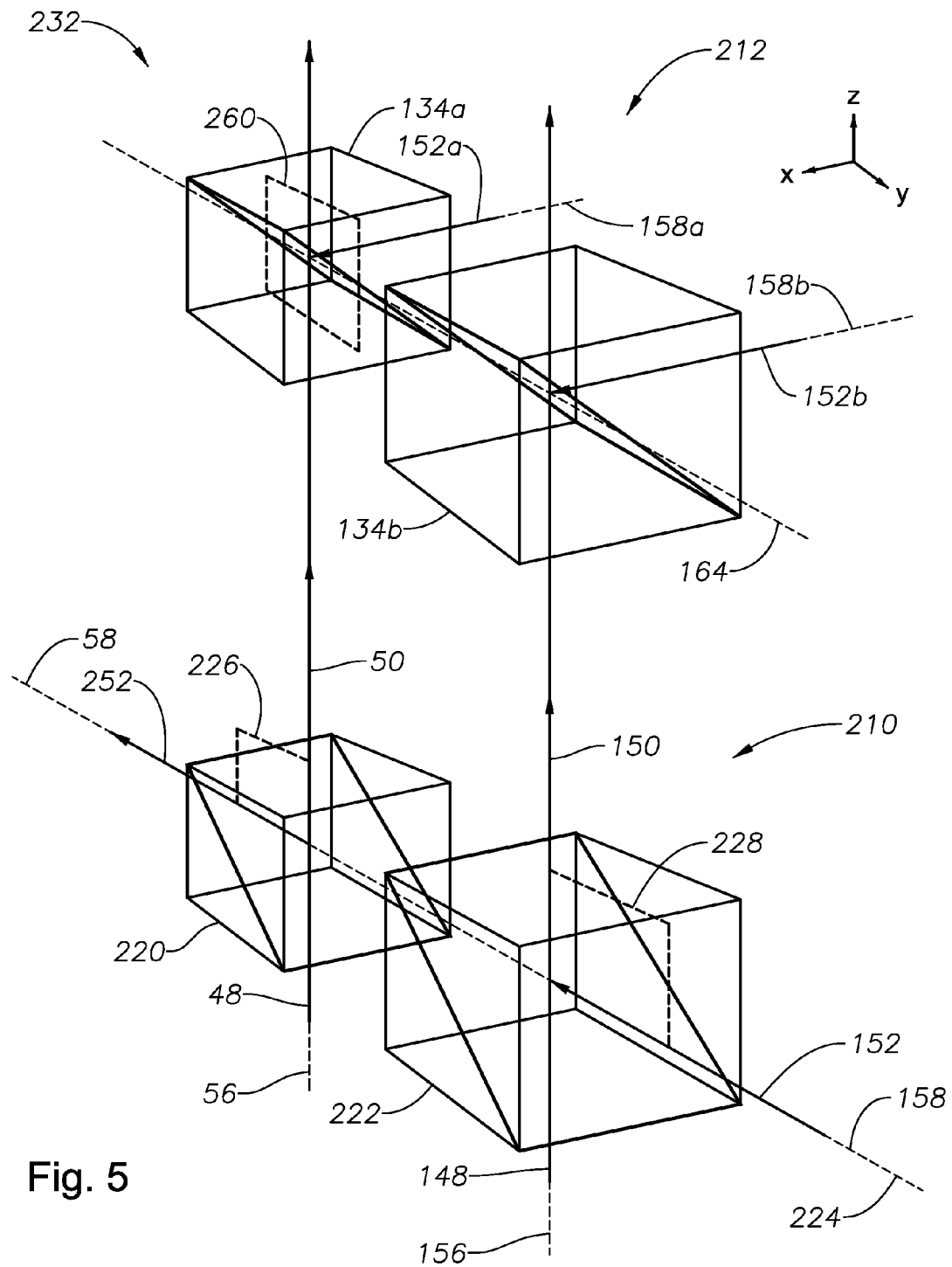
FIG. 5 illustrates another example of a beamsplitter system that may be utilized in a microscope system.

FIG. 5 illustrates an example of a beamsplitter system 232 that may be utilized in a microscope system. In the example, beamsplitter system 232 comprises an alpha beam splitter set 210 and a beta beam splitter set 212. A beam splitter set may be used for a beam splitting system 22 of FIG. 1. In the example, alpha beam splitter set 210 may comprise alpha beamsplitter modules, including beamsplitter modules 220 and 222. Modules 220 and 222 may be aligned along alignment line 224 in any suitable manner.

For example, the modules 220 and 222 may be aligned such that one or more of the following conditions are satisfied: (1) a plane 226 defined by paths 56 and 58 and a plane 228 defined by paths 156 and 158 are substantially coplanar; and/or (2) alignment line 164 substantially coincides with path 58 and/or path 158.

In certain embodiments, beamsplitter module 220 may be substantially similar to beamsplitter module 34. Beamsplitter module 220 may receive an alpha beam 48 traveling along an optical path 56 and split alpha beam 48 into an output beam 50 transmitted along optical path 56 and an alpha split beam 252 directed substantially parallel (e.g., along) to alignment line 224. In certain embodiments, beamsplitter module 222 may be substantially similar to beamsplitter module 134. Beamsplitter module 222 may receive a primary alpha beam 148 traveling along an optical path 156 and a secondary alpha beam 152 traveling along an optical path 158 that is substantially parallel (e.g., along) to alignment line 224. Beamsplitter module 222 may transmit beams 148 and 152 as an output beam 150 substantially parallel to optical path 156.

In certain embodiments, beta beam splitter set 212 may be substantially similar to beamsplitter system 132 of FIG. 4. Beta beam splitter set 212 may comprise beta beamsplitter modules 134 aligned along alignment line 164. Each beta beamsplitter module 134 may receive output beam 50 or output beam 150. Beta beamsplitter module 134 may receive a secondary beta beam 152 traveling along a beta optical path 158 that is substantially orthogonal to a plane 260 defined by alignment line 164 and the optical path of the received output beam 50 or 150. Beta beamsplitter module 134 may transmit the received output beam 50 or 150 and secondary beta beam 152 along a path that is substantially parallel to the optical path of the received output beam 50 or 150. In certain embodiments, secondary beta beam 152 may be directed towards an eyepiece of a set of eyepieces. In certain embodiments, one or more images of secondary beta beam 152 may be injected into the received output beam 50 or 150.

In other embodiments, beta beam splitter set 212 may be substantially similar to beamsplitter system 32 of FIG. 3. Beta beam splitter set 212 may comprise beta beamsplitter modules 34 aligned along alignment line 64. Each beta beamsplitter module 34 may receive output beam 50 or output beam 150 and split the received output beam 50 or 150 into a beta split beams 50 and 52. Beta beamsplitter module 34 may transmit beta split beam 50 along a path that is substantially parallel to the optical path of the received output beam 50 or 150 and may direct beta split beam 52 along an optical path 58 substantially orthogonal to a plane defined by alignment line 64 and the optical path of the received output beam 50 or 150. In certain embodiments, beta split beam 50 may be directed towards an eyepiece of a set of eyepieces. In certain embodiments, an image capture module may receive beta split beam 52 and generate one or more images from beta split beam 52.

A beamsplitter module (e.g., 34 or 134) may have any suitable spectral range, e.g., a broadband visible, IR, or UV range or a narrow spectral range, which may be less than 50 nm wide, e.g., a 520 to 540 nm range. For example, broadband visible range beamsplitter modules may be used. As another example, narrow band beamsplitter modules may be used for image display 42. In this example, close to 100% of light from the target outside of narrow spectral range may be sent to the eye pieces 24.

Although this disclosure has been described in terms of certain embodiments, modifications (such as changes, substitutions, additions, omissions, and/or other modifications) of the embodiments will be apparent to those skilled in the art. Accordingly, modifications may be made to the embodiments without departing from the scope of the invention. For example, modifications may be made to the systems and apparatuses disclosed herein. The components of the systems and apparatuses may be integrated or separated, and the operations of the systems and apparatuses may be performed by more, fewer, or other components. As another example, modifications may be made to the methods disclosed herein. The methods may include more, fewer, or other steps, and the steps may be performed in any suitable order.

Other modifications are possible without departing from the scope of the invention. For example, the description illustrates embodiments in particular practical applications, yet other applications will be apparent to those skilled in the art. In addition, future developments will occur in the arts discussed herein, and the disclosed systems, apparatuses, and methods will be utilized with such future developments.

The scope of the invention should not be determined with reference to the description. In accordance with patent statutes, the description explains and illustrates the principles and modes of operation of the invention using exemplary embodiments. The description enables others skilled in the art to utilize the systems, apparatuses, and methods in various embodiments and with various modifications, but should not be used to determine the scope of the invention.

The scope of the invention should be determined with reference to the claims and the full scope of equivalents to which the claims are entitled. All claims terms should be given their broadest reasonable constructions and their ordinary meanings as understood by those skilled in the art, unless an explicit indication to the contrary is made herein. For example, use of the singular articles such as "a," "the," etc. should be read to recite one or more of the indicated elements, unless a claim recites an explicit limitation to the contrary. As another example, "each" refers to each member of a set or each member of a subset of a set, where a set may include zero, one, or more than one element. In sum, the invention is capable of modification, and the scope of the invention should be determined, not with reference to the description, but with reference to the claims and their full scope of equivalents.

What is claimed is:

1. A system comprising:
   an alpha beamsplitter set comprising a first alpha beamsplitter module and a second alpha beamsplitter module aligned with the first alpha beamsplitter module along an alpha alignment line,
   the first alpha beamsplitter module configured to:
      receive a first alpha beam traveling along a first optical path; and
      split the first alpha beam into a first output beam transmitted along the first optical path and an alpha split beam directed substantially parallel to the alpha alignment line; and
   the second alpha beamsplitter module configured to:
      receive a second alpha beam traveling along a second optical path;
      receive a third alpha beam traveling along a third alpha optical path that is substantially parallel to the alpha alignment line; and
      transmit the second alpha beam and the third alpha beam as a second output beam along the second optical path; and
   a beta beamsplitter set comprising a first beta beamsplitter module and a second beta beamsplitter module aligned with the first beta beamsplitter module along a beta alignment line, each beta beamsplitter module configured to:
      receive the first output beam or the second output beam;
      split the received output beam into a first beta split beam and a second beta split beam;
      transmit the first beta split beam along the optical path of the received output beam; and
      direct the second beta split beam along a beta optical path substantially orthogonal to a plane defined by the beta alignment line and the optical path of the received output beam.

2. The system of claim 1, each beta beamsplitter module configured to transmit the first beta split beam along the first optical path by:
   directing the first beta split beam towards an eyepiece of a set of eyepieces.

3. The system of claim 1, further comprising an image capture module configured to receive the second beta split beam and generate one or more images from the second beta split beam.

4. A system comprising:
   an alpha beamsplitter set comprising a first alpha beamsplitter module and a second alpha beamsplitter module aligned with the first alpha beamsplitter module along an alpha alignment line,
   the first alpha beamsplitter module configured to:
      receive a first alpha beam traveling along a first optical path; and
      split the first alpha beam into a first output beam transmitted along the first optical path and an alpha split beam directed substantially parallel to the alpha alignment line; and
   the second alpha beamsplitter module configured to:
      receive a second alpha beam traveling along a second optical path;

receive a third alpha beam traveling along a third alpha optical path that is substantially parallel to the alpha alignment line; and transmit the second alpha beam and the third alpha beam as a second output beam along the second optical path; and a beta beamsplitter set comprising a first beta beamsplitter module and a second beta beamsplitter module aligned with the first beta beamsplitter module along a beta alignment line, each beta beamsplitter module configured to:

receive the first output beam or the second output beam;

receive a second beta beam traveling along a beta optical path that is substantially orthogonal to a plane defined by the beta alignment line and the optical path of the received output beam;

combine the received output beam and the second beta beam to yield a combined beam; and transmit the combined beam along the optical path of the received output beam.

5. The system of claim 4, each beta beamsplitter module configured to transmit the combined beam by:

directing the combined beam towards an eyepiece of a set of eyepieces.

6. The system of claim 4, each beta beamsplitter module configured to combine the received output beam and the second beta beam by:

combining the received output beam and the second beta beam to inject one or more images of the second beta beam into the first received output beam.

7. The system of claim 4, the second beta beam received from an image display.

8. The system of claim 4, each beamsplitter module operating in a narrow spectral range.

* * * * *